United States Patent [19]
Jackson et al.

[11] 3,722,102
[45] Mar. 27, 1973

[54] DIP STICK

[75] Inventors: Richard H. Jackson, Downers Grove; Harry B. Bak, Westchester, both of Ill.

[73] Assignee: Gits Bros. Mfg. Co., Inc., Chicago, Ill.

[22] Filed: Feb. 24, 1971

[21] Appl. No.: 118,284

[52] U.S. Cl. .................................................33/126.7 R
[51] Int. Cl. ..................................................G01f 23/04
[58] Field of Search ...................................33/126.7 R

[56] References Cited

FOREIGN PATENTS OR APPLICATIONS 1,090,791  4/1955  France...........................33/126.7 R
  771,315  10/1934  France...........................33/126.7 R

*Primary Examiner*—Leonard Forman
*Assistant Examiner*—Charles E. Phillips
*Attorney*—Hill, Sherman, Meroni, Gross & Simpson

[57] ABSTRACT

A dip stick assembly with a tubular body having an internal ledge of a fixed position and a cup-shaped external opened end with a closure cap adapted to close the end, the closure cap having an axial groove receiving the cup-shaped opening of the tubular body, a dip stick fastened to the cap, a bayonet connection between the cap and the body allowing axial movement of the cap with respect to the body, the dip stick having a spring means around the upper portion thereof, the spring means contacting a radial projection member on the dip stick axially movable thereon, the radial projection adapted to contact the internal ledge on the body wherein the spring will force the cap away from the body to maintain the dip stick normally at a given level while depressing the cap towards the body will move the dip stick axially within the body to a measuring level, the spring cooperating with the bayonet lock to maintain the cap securely fastened to the body.

6 Claims, 4 Drawing Figures

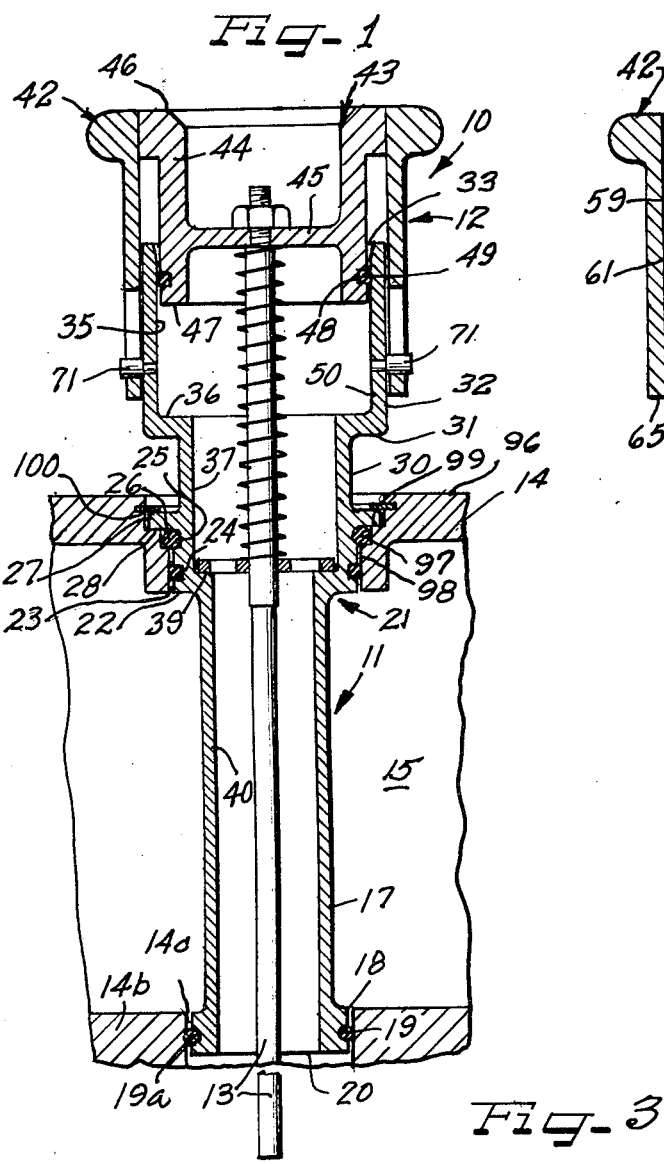
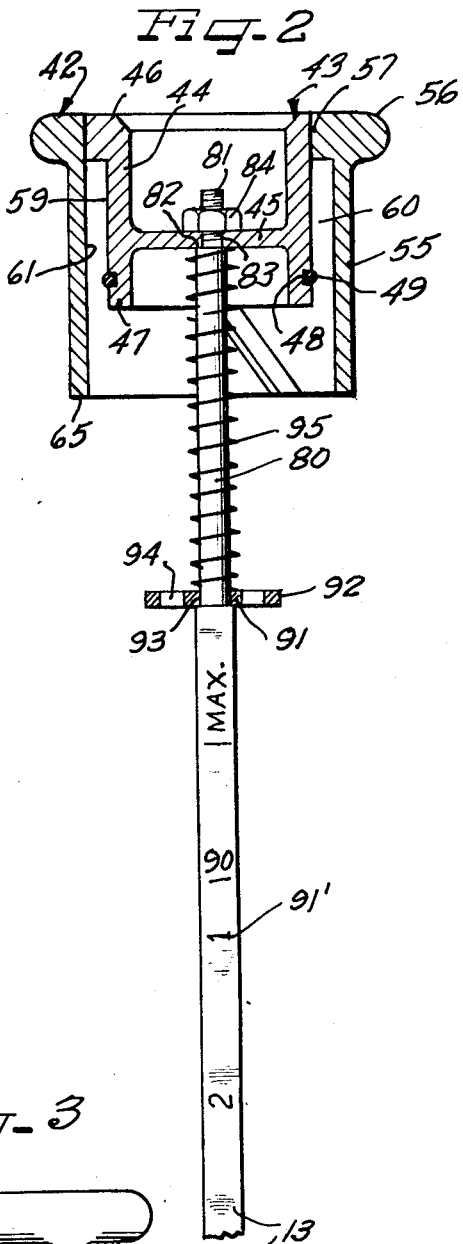
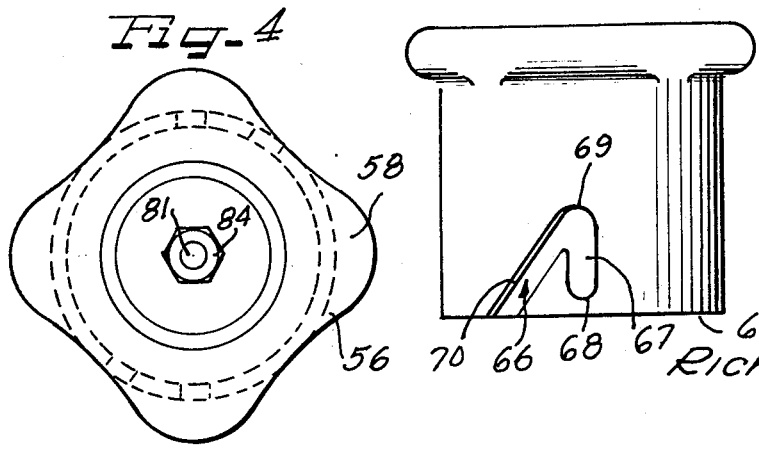
INVENTORS
Richard H. Jackson
Harry B. Bak 3,722,102

DIP STICK

BACKGROUND OF THE INVENTION

1. Field of the Invention

This invention relates to dip sticks and more particularly to a dip stick having a spring means associated therewith for maintaining the stick at a given level, the stick being depressable to a measuring level.

2. Prior Art

Dip sticks for measuring the lubricant level in an engine, transmission, or other type mechanism are old and common to the art. It has also been known to provide attached caps on the ends of such dip sticks, and to attach the caps to the engine or transmission housing in a removable but secured fashion.

However, such prior art dip sticks have had numerous disadvantages when used in connection with high vibration engines such as jet aircraft engines and the like where extreme safety is required. Further, it is oftentimes extremely desirable to limit the amount of travel of the dip stick into the fluid compartment during operation of the respective engine or transmission so that it cannot become enmeshed with the working components. However, it is desirable that the dip stick be insertable to a deeper level for measuring. In order to obtain an accurate reading, it is further desirable to provide a limitation on the maximum depth to which the dip stick can be inserted.

In other embodiments, especially in those embodiments where the stick is used in high-vibratory environment or in an environment where the lubricant may be under greater than atmospheric pressure, it is desirable to seal the dip stick entry point and to protect the major portion of the dip stick.

While various solutions to many of the above problem have been suggested by some of the prior art examples, the prior art has not heretofore achieved adequate solution of all of the problems in a design which is simple, economical to produce and safe to use.

SUMMARY OF THE INVENTION

The present invention overcomes the disadvantages of the prior art by providing a dip stick assembly having three major components, a housing attached body, a cap, and a dip stick. The housing attached body is tubular, having varying diameters to provide a portion insertable within the housing, a wider portion bottomed against the exterior of the housing for accurate positioning of the body and a cup-shaped open end exterior of the housing. An internal ledge is provided at a given point along the length of the body with respect to the end of the cup-shaped opened end. The cap has an axial groove thereinto from one end which receives the peripheral wall of the cup-shaped open end to provide a labyrinth path sealing against escape of oil from the body portion. The inner diameter wall of the groove may contain secondary seals and the outer diameter wall of the groove is equipped with bayonet slots matching with pins on the cup-shaped end of the body to firmly attached the cap to the body in a detachable manner while further allowing axial movement of the cap on the body. The axial movement is limited by contact with the pins against the axial ends of the bayonet slot.

The dip stick is attached to the cap extending axially thereof and has a projecting member positioned around it with a spring interposed between the cap and the projecting member. When the cap is assembled on the body, the projecting member contacts the internal ledge compressing the spring as the cap is moved axially of the body. Thereafter, revolution of the cap to align it with the bayonet slots and release of the axial pressure on the cap will allow the spring to force the cap away from the body portion to thereby position the free end of the dip stick at a desired point in the working environment at a point removed from any possible contact with the working parts.

Thereafter, depression of the cap to the extent allowed by the bayonet slots will move the dip stick to its measuring position within the working environment.

It is therefore an object of this invention to provide a new and improved dip stick assembly.

It is a more specific object of this invention to provide a dip stick assembly wherein the dip stick is maintained at a given level under spring influence and depressable to a measuring level.

It is a more specific object of this invention to provide a dip stick wherein the stick is maintained under spring influence at a given level and depressable to a fixed point for measuring.

It is yet another and more specific object of this invention to provide a dip stick assembly having a body portion with a cup-shaped open end attached to the housing in which the dip stick is to operate, the dip stick being attached to a cap adapted to be received over the cup-shaped end with the stick extending through the body, the cap having an axial groove receiving the peripheral wall of the cup-shaped end, and the cap having bayonet slots cooperating with pins on the cup-shaped end for determining the maximum penetration depth of the dip stick into the working environment, spring means being provided to maintain the dip stick at a depth less than the maximum depth in the absence of unusual pressure against the cap.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary cross-sectional view of the dip stick assembly of this invention received in a housing.

FIG. 2 is a fragmentary cross-sectional view of the dip stick and cap portion of the assembly of FIG. 1.

FIG. 3 is a side plan view of the cap of this invention.

FIG. 4 is a top plan view of the cap of FIG. 3.

DESCRIPTION OF THE PREFERRED EMBODIMENTS

The dip stick assembly 10 of this invention includes three major components, a body portion 11, a cap assembly 12, and a dip stick assembly 13.

The body portion 11 is adapted to be inserted through the side wall 96 of a housing 14 into the interior 15 thereof.

The body 11 is tubular, having a lower portion 17 terminating in an outturned flange portion 18 with a groove 19 therearound. The housing 14 may include an internal wall 14b having an opening 14c therein aligned with the outside opening 99 in the outer wall 96. In such a case, the flange 18 will be dimensioned to be received in the opening 14c with an O-ring seal 19a in the groove 19 sealing the opening 14c except through the body 11. The lower end 20 is open. As illustrated at 21, approximately halfway up the body 11, the outer diameter increases to provide a radially outwardly extending shoulder portion 22 terminating in a cylindrical land 23 into which extends a radial groove 24 and an axially spaced second groove 25. The side wall 26 of the groove 25 remote from the shoulder 22 extends radially outwardly to a circumferential land 27 terminating further radially outwardly than the land 23. The circumferential land 27 is axially narrow and provides a radial abutment wall 28 on a plane with the wall 26 of the groove 25. Axially beyond the land 27, the body 11 is reduced in diameter exteriorly to provide a smaller diameter land 30. Thereafter, the outer diameter increases again at a ledge portion 31 to a full diameter portion 32 which is preferably wider than any other portion of the body 11 and which terminates in an open end 33.

The inner diameter of the tubular body 11 varies, having its greatest diameter 35 in the area of the increased-diameter portion 32 at the open end 33 extending axially inwardly to an internal ledge 36 formed by the inner housing wall of the ledge 31. The diameter is then reduced to an intermediate diameter portion 37 which extends from the inner diameter ledge 36 to a second inner diameter ledge 39 which is illustrated as being positioned adjacent the groove 24 in the first radially thickened portion 23 formed by the shoulder 22. The ledge 39 may be spaced at other points along the body 11. Axially therebeyond the body is reduced to its smallest diameter 40 which continues from the ledge 39 to the open end 20.

In the preferred embodiment, the cap 12 is constructed of two concentric pieces, an outer diameter member 42 and an inner diameter member 43. The inner diameter member is tubular and is H-shaped in cross section having a peripheral circumferential wall 44 with an internal cross beam bridge member 45 located intermediate the axial ends 46, 47 of the peripheral wall 44, and preferably spaced closer to the bottom end 47 than the top or outer end 46. A groove 48 extends circumferentially around the peripheral wall 44 on the exterior thereof closely spaced to the bottom end 47. The outer diameter of the peripheral wall 44 is dimensioned with respect to the inner diameter of the cup-shaped open end 35 of the body such that the inner member 43 can be received within the open end 33 of the body. A seal member 49, preferably of the O-ring type, is received in the groove 48 and is adapted to contact the inner diameter 50 of the cup-shaped portion 35 of the body in sealing relation therewith.

The outer portion 42 of the cap 12 has a substantially tubular portion 55 terminating at one end, the upper end 56, in an in-turned flange 57.

The shape of the end 56 is as illustrated in FIG. 4 where outturned portions 58 are provided to substantially square off the end of the cap to allow gripping for ease of rotation of the cap.

The in-turned flange 57 extends inwardly into contact with the inner portion 43 of the cap at the end 46 thereof. The inner cap portion 43 and the outer cap portion 42 may be splined or otherwise configured to provide for a press-fit mate between the two to lock them together at the contact between the flange 57 and the outer diameter 59 of the end 46 of the inner cap 43. Alternatively, they may be welded or in any other way fixed together.

The provision of the in-turned flange 57 at the end 56 of the outer cap provides for a groove 60 between the inner cap piece 43 and the outer cap portion 42 axially below the flange 57.

The inner diameter 61 of the tubular portion 55 of the outer cap member 42 is dimensioned to be received around the exterior of the end portion 32 of the body 11, in closed spaced relation thereto. Thus, the cup-shaped end of the body extends upwardly into the groove 60 between the inner and outer portions of the cap when the cap is placed over the body. This presents a labyrinth path for escape of oil or vapors or for ingress of foreign matter. Further, the seal 49 effectively prevents such escape or ingress.

As best illustrated in FIG. 2, the tubular portion 55 of the outer cap portion 42 extends axially beyond the end 47 of the inner portion and terminates at a free end 65.

As illustrated in FIG. 3, a pair of bayonet slots 66 are provided in the wall of the tubular portion 55. The slots have axially extending slot portions 67 which have their axial ends 68 and 69 enclosed within the material of the wall of the tubular portion 55. The bottom axial end 68 terminates in spaced relation to the bottom 65 of the tubular portion. An entrance slot 70 extends in at an angle from the end 65 of the tubular portion and is open to the slot 67 at the side thereof at approximately the end 69. Pins 71 are positioned on the exterior of the cup-shaped portion 35 of the body. The pins cooperate with the bayonet slots 66 to affix the cap to the body in the normal manner whereby release of the cap requires depression of the cap until the pins contact the end 69, then rotation of the cap coupled with axial movement to move the pins through the angled slot 70.

The dip stick member 13 has a tubular end portion 80. The end 81 of the tubular portion 80 is reduced in diameter providing a ledge 82. The portion of the end 81 from the ledge to the end is threaded and is received through an opening 83 in the bridge portion 45 of the inner cap portion 43. A nut or the like 84 is received over the threaded end 81 and tightened down on the bridge to firmly affix the dip stick member 13 to the bridge. The provision of the ledge 82 contacting with the portion of the bridge 45 around the opening 83 provides for enclampment of the bridge between the ledge 82 and the nut 84 to affix the dip stick member 13 in a given position with respect to the cap whereby the space between the bottom end 86 of the dip stick and the bridge 45 is pre-determined and fixed.

Intermediate the ends 81, 86 of the dip stick member 13, the member may be flattened out to provide a substantially rectangular portion having a flat face 90 on which measuring indicia 91' may be placed. The point of flattening between the tubular portion 80 and the flattened portion 90 provides a ledge 92. A washer or radial projection member 92 having a central opening 93 dimensioned to be received around the tubular portion 80 abuts the ledge 91. Drainage openings 94 may be provided in the washer. The washer 91 is free to slide along the tubular portion 80 and a coil spring or the like 95 is entrapped between the bridge 45 of the inner cap member 43 and the washer 92 urging the washer against the ledge 91.

When the dip stick is received in the body 11 and the cap is received around the cup-shaped end 35 of the body, the washer 92 will contact the inner ledge 39 of the body in abutting relation therewith. Further, axial movement of the cap and dip stick will compress the spring 95. Thus, when the cap is inserted around the pins 71 and rotated so that the pins are in the slots 67 of the bayonet slot, the compressed spring 95 will push the cap away from the body until the pins 71 contact the end 68 of the bayonet slot. In this position, the depth of penetration of the end 86 of the dip stick member 13 into the housing 14 is determined inasmuch as the spacing between the inner ledge 39 and the bridge 45 is determined due to the spring and the contact between the pins 71 and bayonet slot 66. Further, because the dip stick is affixed to the bridge and is carried by the cap, any movement of the cap will cause a movement of the dip stick. Thus, depressing the cap until the pins 71 contact the end 69 of the bayonet slot will result in insertion of the dip stick 13 a given distance further into the housing 14. In the absence of a force depressing the cap onto the body, the spring 95 will always force the cap away from the body until contact between the pins 71 and the end 68 of the bayonet slot 66. Thus, the dip stick is normally held a given depth into the housing 14, which depth is normally chosen to be sufficiently spaced from operating portions of the machinery so as to prevent contact therewith. When it is desired to take a measure of the oil in the housing 14, the cap is depressed until contact between the pins 71 and the end 69 of the bayonet slot prevents further depression. This will move the dip stick to a measuring depth greater than its normal depth.

The spacing of the body 11 into the housing 14 is predetermined by contact between the outer flange 27 of the body and the wall 96 of the housing 14. O-ring seals 97 received in the grooves 24, 25 and contacting the peripheral wall 98 of the opening 99 of the housing 14 through which the body 11 is received effectively seal the body 11 housing 14 opening. The housing 14 may be configured to allow the body 11 to be fastened thereto as by a snap ring 100.

It will therefore be appreciated that the depth of penetration of the dip stick is at all times controlled, first by the fixed depth penetration of the body due to the contact between the ledge 27 and the surface 96 of the housing wall, secondarily between the fixed positioning of the dip stick to the bridge 45, thirdly due to the maximum-minimum positioning of the cap 12 with respect to the body 11 caused by the bayonet slots 66 and the pins 71 and fourthly, by the action of the spring 95 which tends to maintain a dip stick penetration at the minimum by always urging the pins 71 into contact with the lower axial end 68 of the bayonet slot.

Although we have herein set forth our invention with respect to certain specific principles and details thereof, it will be understood that these may be varied without departing from the spirit and scope of the invention as set forth in the hereunto appended claims.

We claim as our invention:

1. A dip stick assembly comprising: a body portion; said body portion including an elongated tube of axially varying diameter having an inlet end, said inlet end having a circumferential peripheral wall and an open end formed by said wall, a cap portion, said cap portion substantially cup-shaped having a peripheral circumferential wall with an open end defined by portions of said wall, an annular axially extending groove in the cap peripheral wall extending from the open end, said groove dimensioned to receive portions of the circumferential peripheral wall of the inlet end, a dip stick fixedly attached to said cap depending therefrom and projecting from the open end and dimensioned to extend through the body portion when the cap is received around the inlet end peripheral wall of the body portion, and seal means in the groove engaging the inlet and peripheral wall, said body portion has an internal ledge intermediate the ends thereof and the said sip stick has a radial abutment member slidably received therearound and freed for axial movement over at least a portion of the said axial length of the dip stick, the said radial abutment member having an outer diameter greater than the inner diameter of the said internal ledge of the said body portion, and a spring means around the said dip stick entrapped between a portion of the said cap and the said radial abutment urging the said radial abutment away from the said cap whereby when the said radial abutment is abutted against the said internal ledge of the said body, the said spring urges the said cap away from the said body, an axially extending slot and pin assembly, one of said slot and pin assembly being located on said cap and the other of said slot and pin assembly being located on said body, said pin being slidable in said slot to guide the raising and lowering of said cap and dipstick relative to said body, and means on said cap for locking said pin in said slot in an elevated position.

2. The assembly of claim 1 wherein the locking means includes a bayonet slot including a locking slot and pin assembly between the said inlet end peripheral wall and the said cap, the locking slot of the said bayonet slot extending axially whereby axial movement of the said cap with respect to the said body is limited by the said bayonet slot and pin assembly.

3. The assembly of claim 2 wherein the said body has an external radially projecting ledge intermediate the ends thereof, the said ledge adapted to abut the periphery of a housing opening into which the said body is received to dimension the said body at a specified point with respect to the said housing opening.

4. The assembly of claim 2 wherein the said dip stick has a radial abutment thereon limiting movement of the said radially projecting member.

5. The assembly of claim 4 wherein the said axially extending groove of the said cap is formed between an outer circumferential wall member of the said cap and an inner circumferential wall member of the said cap, the two wall members attached together at one end of the said cap and spaced radially apart from one another remote from the said one end to define the said groove, the said inner member being axially shorter than the said outer member.

6. The assembly of claim 5 wherein the said bayonet slot is defined by portions of the said outer wall member and the said pins are affixed to portions of the outer periphery of the inlet end of the said body member.

* * * * *